US012149538B2

United States Patent
Norman et al.

(10) Patent No.: US 12,149,538 B2
(45) Date of Patent: Nov. 19, 2024

(54) TECHNIQUES FOR DEPLOYMENT OF DECEPTIVE DECOY ELEMENTS IN COMPUTING ENVIRONMENTS

(71) Applicant: ITsMine Ltd., Herzliya (IL)

(72) Inventors: Ran Norman, Rishon LeZion (IL); Guy Ben Mayor, Rishon LeZion (IL); Kfir Kimhi, Herzliya (IL)

(73) Assignee: ITsMine Ltd., Herzliya (IL)

( * ) Notice: Subject to any disclaimer, the term of this patent is extended or adjusted under 35 U.S.C. 154(b) by 404 days.

(21) Appl. No.: 17/646,337

(22) Filed: Dec. 29, 2021

(65) Prior Publication Data

US 2022/0210163 A1 Jun. 30, 2022

Related U.S. Application Data

(60) Provisional application No. 63/132,557, filed on Dec. 31, 2020.

(51) Int. Cl.
*H04L 9/40* (2022.01)
*G06Q 10/0639* (2023.01)

(52) U.S. Cl.
CPC ..... *H04L 63/105* (2013.01); *G06Q 10/06395* (2013.01); *H04L 63/20* (2013.01)

(58) Field of Classification Search
CPC .. H04L 63/105; H04L 63/20; G06Q 10/06395
USPC .......................................................... 726/1
See application file for complete search history.

(56) References Cited

U.S. PATENT DOCUMENTS

| 11,093,611 B2 * | 8/2021 | Kimhi | G06F 21/556 |
| 11,687,650 B2 * | 6/2023 | Kimhi | H04L 63/1491 |
| | | | 726/23 |
| 2016/0359882 A1 * | 12/2016 | Touboul | G06F 21/55 |
| 2017/0272472 A1 * | 9/2017 | Adhar | G06F 21/602 |

FOREIGN PATENT DOCUMENTS

WO    WO-2017013589 A1 *  1/2017   ........... G06F 21/554

* cited by examiner

*Primary Examiner* — Kambiz Zand
*Assistant Examiner* — Aubrey H Wyszynski
(74) *Attorney, Agent, or Firm* — M&B IP Analysts, LLC (57) ABSTRACT

A system and method for the deployment of deceptive decoy elements in a computerized environment to increase user compliance with a cyber security policy. A method includes: deploying a deceptive decoy element in a folder stored in a computerized environment, wherein a user is associated with a dataset indicating a user permission, the folder having a sensitivity level, wherein the deceptive decoy element is a data element deployed based on the sensitivity level of the folder in which the deceptive decoy element is deployed, wherein each deceptive decoy element is configured to provide an indication of a trigger event when triggered by the user; generating a customized electronic message for the user when the indication of the trigger event is provided by the deceptive decoy element, wherein the customized electronic message is generated based on the dataset associated with the user; and sending the customized electronic message for display.

19 Claims, 6 Drawing Sheets

TECHNIQUES FOR DEPLOYMENT OF DECEPTIVE DECOY ELEMENTS IN COMPUTING ENVIRONMENTS

CROSS-REFERENCE TO RELATED APPLICATIONS

This application claims the benefit of U.S. Provisional Application No. 63/132,557 filed on Dec. 31, 2020, the contents of which are hereby incorporated by reference.

TECHNICAL FIELD

The present disclosure generally relates to data security, and more specifically to deploying deceptive decoy elements in a computing environment to increase compliance of users with cyber security policies.

BACKGROUND

Enterprises all over the world hold sensitive and confidential information related to their business, employees, and clients. This confidential information is sometimes stored in simple folders in a computerized environment such as an enterprise network. In some countries, a data breach that occurs in an enterprise database, network, etc., may lead to a financial penalty. Moreover, the enterprise may be perceived as vulnerable, and clients and partners may not want to cooperate with a vulnerable enterprise.

Therefore, enterprises usually use many kinds of software to prevent data leakages and similar incidents. One of the common techniques is using a cyber security awareness campaign. Cyber security awareness campaigns are used for anchoring information security awareness in the company's culture by reminding the cyber security policy of the company to the company's employees.

Some existing solutions use email messages and notifications that are proactively and periodically sent to the company's employees. Such solutions may be very bothersome for the employees due to general reminders of best cybersecurity practices and, consequently, may be ignored. While some employees may fully cooperate with the cyber security policy of the company, other may need to be reminded, but the ability to simply ignore email messages may thwart attempts to increase compliance.

It would be advantageous to provide a solution that overcomes the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for the deployment of deceptive decoy elements in a computerized environment to increase cyber security policy compliance. The method comprises: deploying at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user; generating a customized electronic message for the user when the indication of the trigger event is provided by one of the at least one deceptive decoy element, wherein the customized electronic message is generated based on the dataset associated with the user; and sending the customized electronic message for display on a user device of the user.

Certain embodiments disclosed herein also include a non-transitory computer readable medium having stored thereon causing a processing circuitry to execute a process, the process comprising: deploying at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user; generating a customized electronic message for the user when the indication of the trigger event is provided by one of the at least one deceptive decoy element, wherein the customized electronic message is generated based on the dataset associated with the user; and sending the customized electronic message for display on a user device of the user.

Certain embodiments disclosed herein also include a system for the deployment of deceptive decoy elements in a computerized environment to increase cyber security policy compliance. The system comprises: a processing circuitry; and a memory, the memory containing instructions that, when executed by the processing circuitry, configure the system to: deploy at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user; generate a customized electronic message for the user when the indication of the trigger event is provided by one of the at least one deceptive decoy element, wherein the customized electronic message is generated based on the dataset associated with the user; and send the customized electronic message for display on a user device of the user.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

It is important to note that the embodiments disclosed by the present disclosure are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Techniques for the deployment of deceptive decoy elements in a computerized environment in order to increase compliance of users with a cyber security policy are disclosed. A method includes receiving an input indicating a user that was selected to be part of a cyber security awareness campaign, where the user is associated with a first dataset indicating a user permission to access one or more folders. Each folder has a set of characteristics indicating a sensitivity level. Deceptive decoy element are generated and deployed in the one or more folders, where the deployment is based on at least the sensitivity level of the folder. Each deceptive decoy element is configured to provide an indication of a trigger event when triggered by the user. When an indication of a trigger event is provided by one of the deceptive decoy elements, a customized electronic message is generated. The customized electronic message is designed to increase the compliance level of the user to the cyber security policy.

The disclosed embodiments provide techniques for improving cyber security within a computing environment by manipulating user interactions with the computing environment in order to automatically detect deviations from a cyber security policy. More specifically, the disclosed embodiments allow for altering the computing environment by deploying deceptive decoy elements in the computing environment and for securely monitoring activity of users within the computing environment via the deployed deceptive decoy elements.

Each deceptive decoy element is a data element designed to simulate another data element of the computing environment while excluding one or more predetermined types of sensitive data (e.g., confidential data, data containing necessary information for one or more tasks, etc.), for example, excluding certain types of data that are known to normally be included in a type of data element being simulated by the deceptive decoy element.

Because the deceptive decoy elements do not contain confidential or otherwise sensitive information, user attempts to access the deceptive decoy elements will not cause loss or theft of data even if such access attempts are performed improperly per the cybersecurity policy. Further, when the user prompts a trigger event while accessing the deceptive decoy element, they may not obtain the information for which they accessed the deceptive decoy element. Thus, the customized electronic message generated in response to the trigger event may be more noticeable to a user as compared to, for example, a generic email reminding the user of general best practices under the cyber security policy.

Figure 1:
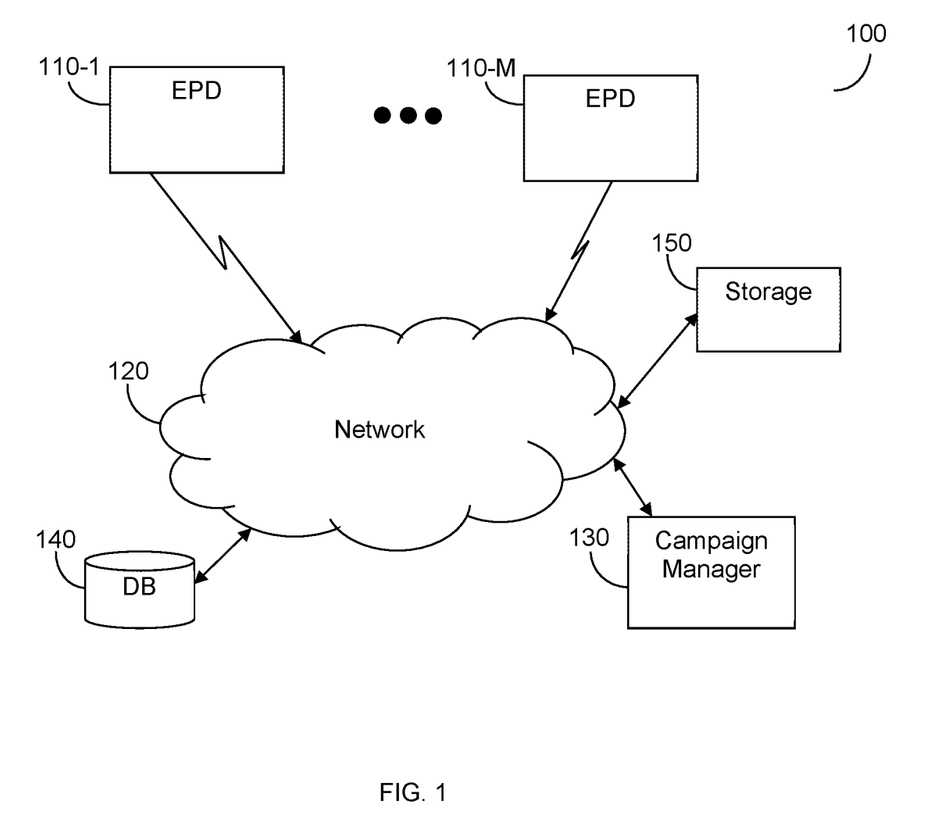
FIG. 1 is a network diagram utilized to describe various disclosed embodiments.

FIG. 1 depicts a network diagram 100 utilized to describe various disclosed embodiments. A network 120 is used to enable communication between the different components of the network diagram 100. The network 120 may be, but is not limited to, a local area network (LAN), a wide area network (WAN), a metro area network (MAN), the world wide web (WWWW), the Internet, a wired network, a wireless network, and the like, as well as any combination thereof.

A plurality of endpoint devices (EPD) 110-1 through 110-M, where M is an integer equal to or greater than 1, communicate via the network 120. The EPDs 110 can be, but are not limited to, smart phones, mobile phones, laptops, tablet computers, wearable devices, personal computers (PCs), a combination thereof, and the like.

A campaign manager 130 further communicates via the network 120. The campaign manager 130 may be configured to execute predetermined computing tasks. The campaign manager 130 is configured to deploy deceptive decoy elements and generate customized messages for users when deceptive decoy elements are triggered (for example, but not limited to, by a user using one of the endpoint devices 110) as described herein.

A database (DB) 140 may also communicate via the network 120. The database 140 is configured to store, for example, data related to previous deceptive decoy elements that were generated by the campaign manager 130, information related to users that were selected to be part of the cyber security awareness campaign, users' access permissions, and so on.

A storage 150 may also communicate via the network 120. The storage 150 may be a storage of a computing environment configured to contain folders and files of an entity, such as, but not limited to, a company. As further discussed herein below, the storage 150 may contain folders that include different type of files having different sensitivity levels.

In an embodiment, the campaign manager 130 is configured to receive an input indicating at least one user that was selected to be part of a reactive cyber security awareness campaign. The input may be received from, for example, one of the endpoint devices 110 that is associated with a security manager of a company. The input may include one or more identifiers enabling identification of the user such as, but not limited to, the name of the selected user (e.g., employee name), employee ID number, employee code, combinations thereof, and the like.

Existing cyber security awareness campaign solutions provide techniques by which reminders as well as fake attempts to ask for private information or confidential business information are sent to employees and other representatives of a company that have access to information owned by the company. As further discussed herein below, the disclosed solution uses a reactive cyber security awareness campaign including deployment of deceptive decoy elements that, when triggered by a user, enable to perform an (reactive) action such as generating and presenting a customized alert that is used for improving the compliance of the user to the cyber security policy of the company.

The selected users may be, for example, one or more employees of a certain department of the company, executives, combinations thereof, and the like, that were selected by a security manager to be part of a cyber security campaign. Each selected user is associated with a dataset indicating user permissions to access at least one folder of a plurality of folders that is stored in a computerized environment, such as, a file system of the company (e.g., a file system realized in the storage 150, not shown).

In an embodiment, the dataset associated with each user includes data such as, but not limited to, historical data of the user (e.g., historical records of security incidents involving the user), characteristics of the user (age, specific role, etc.), combinations thereof, and the like. According to an embodiment, the selection of the users may be performed automatically by the campaign manager 130 based on the datasets associated with the users. For example, a user may be selected automatically based on one or more previous security incidents, a sensitive role, number of sensitive folders to which the user has permission to access, and so on. In an embodiment, each of the plurality of folders has a set of characteristics. The set of characteristics for a folder, when analyzed, is indicative of a sensitivity level of the folder.

According to an embodiment, the campaign manager 130 is configured to generate at least one deceptive decoy element. Each deceptive decoy element is or includes a data element, such as a data file, that is designed to simulate a regular data element. However, the deceptive decoy element excludes certain predetermined types of data, such as, but not limited to, data indicating any confidential or necessary information. The deceptive decoy element is placed in one or more folders of a computerized environment and is configured to provide an electronic indication when triggered by the at least one user.

Specifically, a deceptive decoy element is configured to provide (e.g., to send to the campaign manager 130) an indication of a trigger event that triggered the deceptive decoy element by which the campaign manager 130 is configured to determine (or receive an indication of) whether, for example, the user has opened or otherwise accessed the deceptive decoy element. The indication may include, for example, the identity of the entity, the path made until opening the deceptive decoy element (e.g., the number of folders encountered by the user until they reached the folder storing the deceptive decoy element, a listing of all folders and files encountered by the user until they reached the folder storing the deceptive decoy element, etc.), and the like.

The folder in which a deceptive decoy element is deployed may contain data associated with different matters such as, finance, marketing, human resources, and the like, that may include sensitive information that should be protected against data threats. The computerized environment may include, for example, a plurality of EPDs 110 communicatively connected by an enterprise network. Each one of the EPD 110 may be able to access the folder. Thus, the disclosed embodiments provide protection for data stored in the computerized environment.

In order to generate the deceptive decoy element, the campaign manager 130 is configured to collect information corresponding to the folders to which the selected users have permission to access. The information may refer to the folder's content (e.g., files), and may include the files' names, creation date, date modified, size, type, language, amount, and so on. For example, a folder associated with an enterprise finance department may contain 700 files that have similar properties that may indicate that all of the files were created during the same year, the files' average size is 215 kilobytes (KB), and so on.

The campaign manager 130 may be configured to analyze the information associated with a given folder in order to determine the properties of the folder. The analysis may include calculating the files' size in order to determine the files' average size, comparing the filenames to a set of predetermined keywords that enable categorization of each of the folder, both, and the like. Accordingly, such properties of the folders may include a file size of each folder, an average file size of the folders, a category for each folder, a combination thereof, and the like.

Based on the folders' properties, the campaign manager 130 is configured to generate at least one deceptive decoy element. Each deceptive decoy element may be generated such that it simulates a respective data element (e.g., a file) in the computing environment, for example, such that the deceptive decoy element possesses one or more properties in common with the simulated data element. Such common properties may include, but are not limited to, file size, metadata such as keywords, date or timestamps (e.g., data of creation or timestamp of latest change), combinations thereof, and the like.

As a non-limiting example, the campaign manager 130 may determine that a certain folder contains 200 PDF files having an average size of 1,045 KB, created in 2017, having keywords related to marketing. Then, the campaign manager 130 generates 60 deceptive decoy elements. According to the same example, one of the 60 deceptive decoy elements may be a 1,015 KB PDF file, having keywords related to marketing, having a creation date from 2017, and the like.

According to an embodiment, the campaign manager 130 is configured to deploy the generated at least one deceptive decoy element in at least one folder to which the user has permission to access. In a further embodiment, the at least one deceptive decoy element may be deployed for a predetermined period of time, such as one week, one month, and the like.

According to an embodiment, the deployment may be based on a sensitivity level of the folder. For example, the number of deceptive decoy elements to be deployed or the configuration of the deceptive decoy elements may be set depending on the sensitivity level of the folder. To this end, the campaign manager may be configured to determine the sensitivity level of the folder. The sensitivity level of a folder may be determined based on, but not limited to, types of data stored in the folder (e.g., certain types of data may have predetermined values), the amount of data stored in the folder, whether the folder requires authentication, combinations thereof, and the like.

According to another embodiment, the deployment may be based further on the dataset associated with the user, indicating, for example, previous security incidents of the user, current security level classification of the user, user's role, combinations thereof, and the like. As noted above, the at least one deceptive decoy element is configured to provide an indication when triggered by the at least one user.

As a non-limiting example, upon determining that a certain folder includes low value information such that the folder is determined to be a low-risk sensitivity folder, the campaign manager 130 may deploy 0-10% of deceptive decoy elements within the folder (i.e., deploy deceptive decoy elements such that between 0 and 10% of data elements in the folder are deceptive decoy elements). According to the same example, in case the folder includes medium value information, the campaign manager 130 may deploy 10-30% of the folder as deceptive decoy elements, and in case the folder includes high value information, the campaign manager 130 may deploy 30-50% of the folder as deceptive decoy elements.

In order to determine the sensitivity level of the folder, the campaign manager 130 is configured to collect and analyze information related to the folders to which the user has permission to access. The analysis of the information may include checking whether one or more items exist in the data of the folder such as, but not limited to, a certain keyword, identifiers, and the like, which indicate that the folder contains confidential or restricted information. The analysis may further include checking the identity of the entity that handled the files related to the folder, checking how this entity reached the folder, whether the entity is a user or a computer, combinations thereof, and the like. In addition, the analysis may further include checking whether certain parameters in the folder have exceeded a predetermined value., As a non-limiting example, in case there are more than two social security numbers stored therein, the folder may be categorized as a high-risk folder.

According to an embodiment, upon receiving at least a first indication of a triggered deceptive decoy element, the campaign manager 130 is configured to generate at least one customized electronic message that is designed to increase a compliance level of the user to the cyber security policy of the company. The customized electronic message may be generated based on the dataset associated with the user. The deceptive decoy elements that are being deployed in the folders may be triggered when a trigger event occurs. The trigger event may occur when, for example, a deceptive decoy element is opened, saved, copied, sent to a different endpoint device, a combination thereof, and so on.

It should be noted that the deceptive decoy element may be triggered by a trigger event that occurs when the folder (i.e., a legitimate folder) in which the deceptive decoy element is deployed, was opened, copied, and the like. Thus, even when the user has not made any direct action with respect to the deceptive decoy element, an indication showing that the user handled a folder that contains one or more deceptive decoy elements may be generated by at least one deceptive decoy element. The customized electronic message may be an electronic mail (email), short message service (SMS), a desktop notification, and the like. In an embodiment, the customized electronic message is further generated based on the set of properties of the folder that was handled by the user.

The customized electronic message that is designed to increase compliance level for the user may be based on, but not limited to, the user's previous security incidents, user's role, a seniority of the user within an organization, a type of data element or folder that was handled in causing the trigger event, a sensitivity level of the folder that was handled, a combination thereof, and the like. The customized electronic message may include text, multimedia contents, both, and the like, that are designed to remind and explain the cyber security policy of the company in order to improve awareness and increase compliance to the cyber security policy of the company.

As a non-limiting example, a first customized electronic message that would be generated at the very first time in which a first user opens a deceptive decoy element would be different from a second customized electronic message that would be generated when the same user opens a deceptive decoy element for the fifth time. In such an example, the first customized electronic message may only include a few sentences of text, while the second customized electronic message may include more text as well as a video about the policy.

As another non-limiting example, a first customized electronic message that would be generated when the folder that was handled by a first user had a relatively low sensitivity rank would be different from a second customized electronic message that would be generated when the same user handles a folder having a relatively high sensitivity rank. In such an example, the first customized electronic message may only include a reminder of the portion of the policy being violated by the user's actions, while the second customized electronic message may also include an explanation of the policy and its significance.

As yet another non-limiting example, a first customized electronic message that would be generated for a first user having a seniority of five years at the company may be different from a second customized electronic message that would be generated for a second user that have been working at the company for only three months. In such an example, the first customized electronic message may only include a reminder of the portion of the policy being violated by the user's actions, while the second customized electronic message may also include an explanation of how to comply with the policy.

According to an embodiment, the deceptive decoy element may include the customized electronic message such that when the user tries to open the deceptive decoy element (e.g., that simulates a regular file), the customized electronic message that is designed to increase the compliance level of the user to the cyber security policy of the company is presented to the user.

According to another embodiment, the campaign manager 130 sends the customized electronic message, through the network (e.g., the network 120) to at least one designated endpoint device (e.g., the EPD 110) of the user. According to another embodiment, the electronic message may be sent to an endpoint device that is associated with the security department or security manager of the company. That is, the security manager may receive an alert indicating that one or more deceptive decoy elements were triggered. Such an alert may be a copy of the customized electronic message or another notification of the triggering of the deceptive decoy element that may be sent to the endpoint device of the security manager.

According to a further embodiment, the campaign manager 130 eliminates the at least one deceptive decoy element from the at least one folder when a predetermined period of time ends. That is, during the period at which a cyber security awareness campaign occurs, deceptive decoy elements may be eliminated from some folders while other folders may still contain one or more deceptive decoy elements.

According to an embodiment, the campaign manager 130 generates a corresponding compliance level score indicating the compliance level of the user to the cyber security policy based on the user's interactions in the computing environment and, more specifically, based on any triggers of deceptive decoy elements caused by the user. The compliance level score may be, for example, an integer between "1" to "5", where "1" is the lowest score indicating that the user needs to improve the compliance level to the cyber security policy of the company, and "5" is the highest score indicating that the user fully understands and cooperates with the cyber security policy of the company.

The generation of the corresponding compliance level score may be based on an indication of a trigger event provided by a deceptive decoy element. That is, based on receiving, monitoring, and analyzing the indications provided by one or more deceptive decoy elements that were triggered by the user, the compliance level score may be generated and thereafter periodically updated with any new indications received from the deceptive decoy elements. The generation of the compliance level score may be achieved using, for example, a predetermined set of rules that may be applied to the indications. As a non-limiting example, a rule may define that when a first indication noted that a first deceptive decoy element was opened only once by the user and after the user read the customized electronic message no security incidents were recorded for one month, the compliance level score may be "4" (which is a relatively high score). As another non-limiting example, a rule may define that, when an indication noted that a deceptive decoy element was sent by the user to a different endpoint device, the compliance level score may be "1" (which is the lowest score).

According to an embodiment, the campaign manager 130 is configured to classify the at least one user based on the corresponding compliance level score. The classification may include several categories such as, but not limited to: category "A" that may include users that fully cooperate with the cyber security policy of the company and also report on suspicious files which they are not familiar with; category "B" may include users that fully cooperate with the cyber security policy of the company; category "C" may include users that are generally cooperating with the cyber security policy of the company but had some security incidents (e.g., opened one or more deceptive decoy elements); category "D" may include users that had triggered a number of deceptive decoy elements that is above a predetermined threshold (e.g., more than 3 per week). The category ("c") may include users that had triggered a number of deceptive decoy elements that is below a predetermined threshold (below 3 per week). In an embodiment, the classification may be achieved using a predetermined set of rules.

According to a further embodiment, each indication that is provided by the deceptive decoy elements with respect to each of the selected users may be monitored and stored in a database (e.g., the database 140) such that the corresponding compliance level score may be periodically updated with any new indications received from the deceptive decoy elements. In addition, the abovementioned classification of the user may be also updated based on the new indications.

According to an embodiment, the campaign manager 130 may be configured to generate an electronic recommendation to restrict a first user permission to access at least a first folder. The recommendation to restrict the access to a first folder may be based on determination that no indication was received from the at least one deceptive decoy element that is located in the at least a first folder during the predetermined period of time. The electronic recommendation may be sent through the network (e.g., the network 120) to an endpoint device (e.g., EPD 110) of, for example, the security manager of the company.

According to a further embodiment, upon determination that no indication was received from a first deceptive decoy element that is located in a first folder during a predetermined period of time, the campaign manager 130 may generate an electronic notification indicating that the user has not accessed the first folder for a while. The electronic notification may be sent to an endpoint device (e.g., the EPD 110) of the user to notify the user that although the user has access to the first folder, no activity of the user has been recorded with respect to the first folder along the predetermined period of time. According to the same embodiment, the electronic notification may include a query for the user, asking the user whether the user still needs access to the first folder or maybe the user would like to choose to cancel the access to the first folder. According to the same embodiment, upon receipt of a user response regarding the query indicating that the user does not want or need access to the first folder, the campaign manager 130 may be configured to, for example, restrict the user permission to access the first folder, send an alert to a security manager to restrict the user permission to access the first folder, and the like.

In an embodiment, the campaign manager 130 may be configured to constantly monitor the information corresponding to the folder for determining whether changes have occurred within the folder, and may be further configured to update the sensitivity level of the folder periodically or as such changes occur. For example, a folder categorized as a low-risk folder on a certain date may be categorized as high-risk folder, i.e., containing high value information, on the following day. The reasons for such a change may be the addition of one or more confidential files to the folder, the identity of the entities that handled the folder between these days, and the like.

In an embodiment, based on the determination that a change that requires a different sensitivity level has occurred, the campaign manager 130 may be configured to update the sensitivity level of the folder. According to a further embodiment, the campaign manager 130 is configured to update the deployment of the at least one deceptive decoy element based on the updated sensitivity level of the folder. As a non-limiting example, in case a low-risk folder contains 1% of deceptive decoy elements, after the sensitivity level increases and is updated respectively, the campaign manager 130 may deploy 25% of deceptive decoy elements in the folder. According to another embodiment, the deployment of the deceptive decoy elements may be executed on any of computer-based local systems, computer-based cloud systems (e.g., Microsoft® One Drive, Google® Docs, etc.), and on structured data environment such as enterprise resource planning (ERP) systems.

Figure 2:
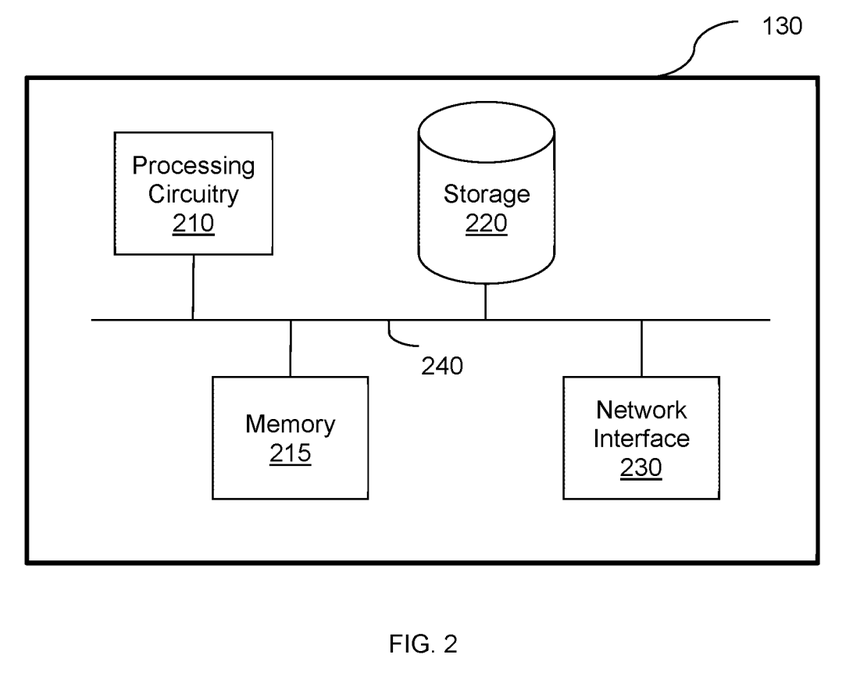
FIG. 2 is an example schematic diagram of a campaign manager according to an embodiment.

FIG. 2 is an example schematic diagram of the campaign manager 130 according to an embodiment. The campaign manager 130 includes a processing circuitry 210 coupled to a memory 215, a storage 220, and a network interface 230. In another embodiment, the components of the campaign manager 130 may be connected via a bus 240.

The processing circuitry 210 may be realized as one or more hardware logic components and circuits. For example, and without limitation, illustrative types of hardware logic components that can be used include one or more field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), GPUs, and the like, or any other hardware logic components that can perform manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The network interface 230 allows the campaign manager 130 to communicate with at least the database and the EPDs 110 over a network (e.g., the network 120), all of FIG. 1, for the purpose of, for example, receiving inputs indicating the selected user(s), generating deceptive decoy elements, deploying the deceptive decoy elements in folders, generating customized electronic messages designed to increase the compliance level of users to cyber security policy of a company, and the like.

It should be understood that the embodiments described herein are not limited to the specific architecture illustrated in FIG. 2, and other architectures may be equally used without departing from the scope of the disclosed embodiments.

Figure 3:
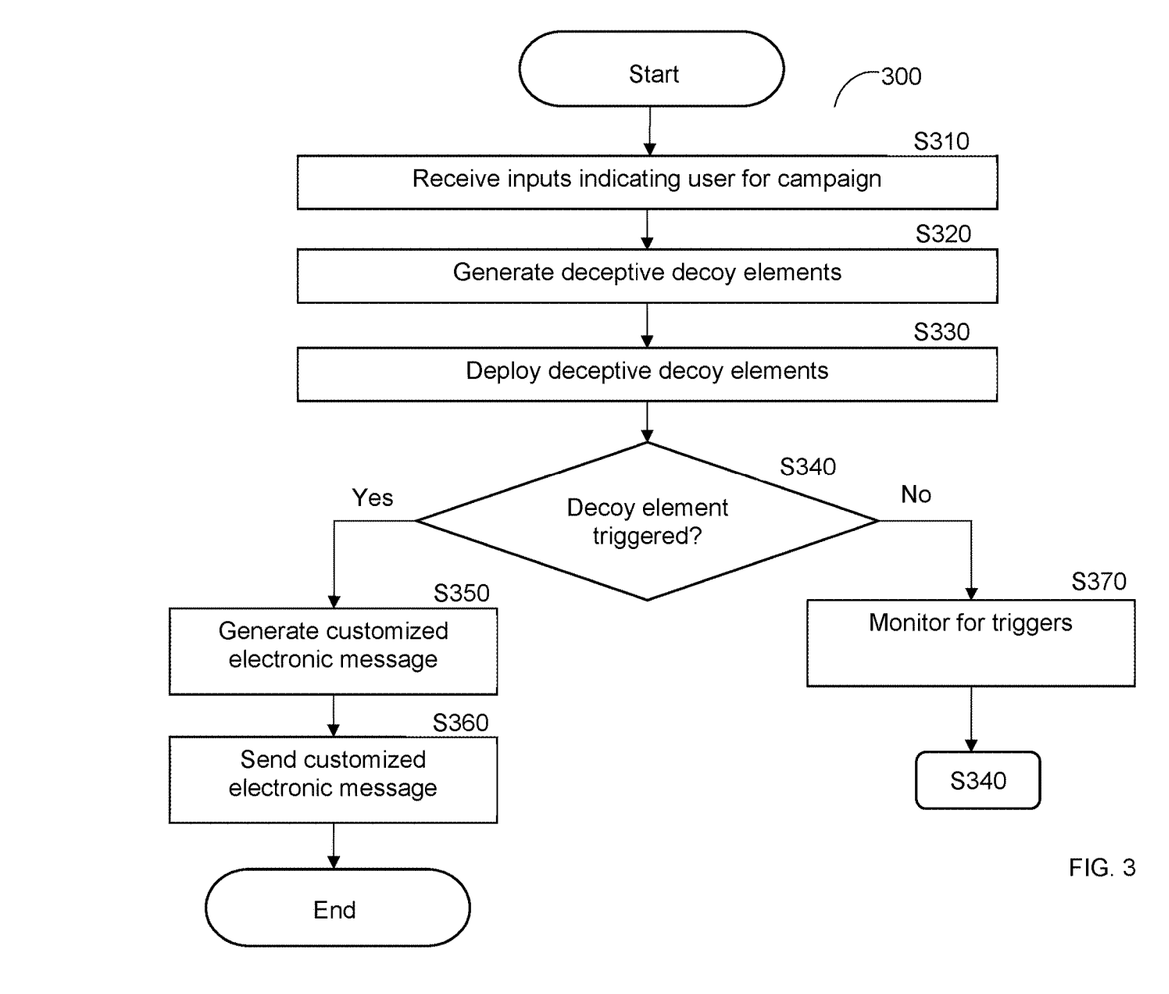
FIG. 3 is a flowchart illustrating a method for generating a customized electronic message designed to increase the compliance of users to a cyber security policy using deceptive decoy elements according to an embodiment.

FIG. 3 is an example flowchart 300 illustrating a method for generating a customized electronic message designed to increase the compliance of users to a cyber security policy using deceptive decoy elements according to an embodiment. In an embodiment, the method described herein below may be executed by a campaign manager (e.g., the campaign manager 130, FIG. 1).

At S310, an input indicating a user that was selected to be part of a reactive cyber security awareness campaign is received. The user is associated with a first dataset. The first dataset may indicate at least one user permission to access at least one folder of a plurality of folders that is stored in a computerized environment, such as a file system of a company. In an embodiment, the first dataset includes, for example, historical data of the user (e.g., historical record of security incidents), characteristics of the user (age, specific role, etc.), and so on. In an embodiment, each of the plurality of folders has a set of characteristics. The set of characteristics, when analyzed, is indicative of a sensitivity level of each of the plurality of folders.

At S320, at least one deceptive decoy element is generated. Each deceptive decoy element is a data element, such as a data file, that is designed to simulate a regular data element, e.g., a data file. However, the deceptive decoy element excludes one or more predetermined types of data normally included in such a regular data element such as, but not limited to, types of data including any confidential or necessary information. More specifically, the deceptive decoy element may be designed to simulate a type of data element which includes at least one type of data and has average or otherwise typical properties among data elements in a given folder or computing environment, and the deceptive decoy element may exclude one or more of the types of data normally included in that type of data element. As noted above, this may allow for protecting potentially sensitive information while allowing users to attempt to access deceptive decoy elements, thereby allowing for evaluating the compliance of the user with a cyber security policy without exposing underlying sensitive data to cyber threats.

Each deceptive decoy element is designed to be placed in one or more folders of a computerized environment and is configured to provide an electronic indication when triggered by a user as further described herein above.

At S330, the generated at least one deceptive decoy element is deployed in at least one folder to which the user has permission to access. In an embodiment, the deceptive decoy element may be deployed for a predetermined period of time. According to one embodiment, the deployment may be based on a sensitivity level of the folder. According to another embodiment, the deployment may be based further on the first dataset of the user, indicating, for example, previous security incidents of the user, current security level classification of the user, user's role, and the like.

At S340, it is checked whether an electronic indication of a triggered deceptive decoy element was provided (i.e., whether the deceptive decoy element was triggered) and if so, execution continues with S350; otherwise, execution continues with S370.

At S350, a customized electronic message that is designed to increase the compliance level of the user to the cyber security policy of the company is generated. The customized electronic message may be generated based on the first dataset of the user. According to further embodiment, the customized electronic message may be generated based on the set of properties of the folder that was handled by the user, as further described herein above.

At S360, the customized electronic message is sent to, for example, a designated endpoint device (e.g., the endpoint device 110) of the user, to designated server, to an endpoint device that is associated with the security manager of the company, and so on.

At S370, when it is determined that no indication was provided (i.e., the deceptive decoy element was not triggered), the campaign manager (e.g., the campaign manager 130) may be configured to continue monitoring, for example, a log file that is designed to record each indication received from each deceptive decoy element and execution may continue at S340 for additional trigger checks.

It should be noted that FIG. 3 is described with respect to a single user merely for simplicity purposes, but that the disclosed embodiments may be equally applicable to multiple users. Deceptive decoy elements may be deployed for the users in series or in parallel, and the deployment of deceptive decoy elements may be further based on the multiple users without departing from the scope of the disclosure.

Figure 4:
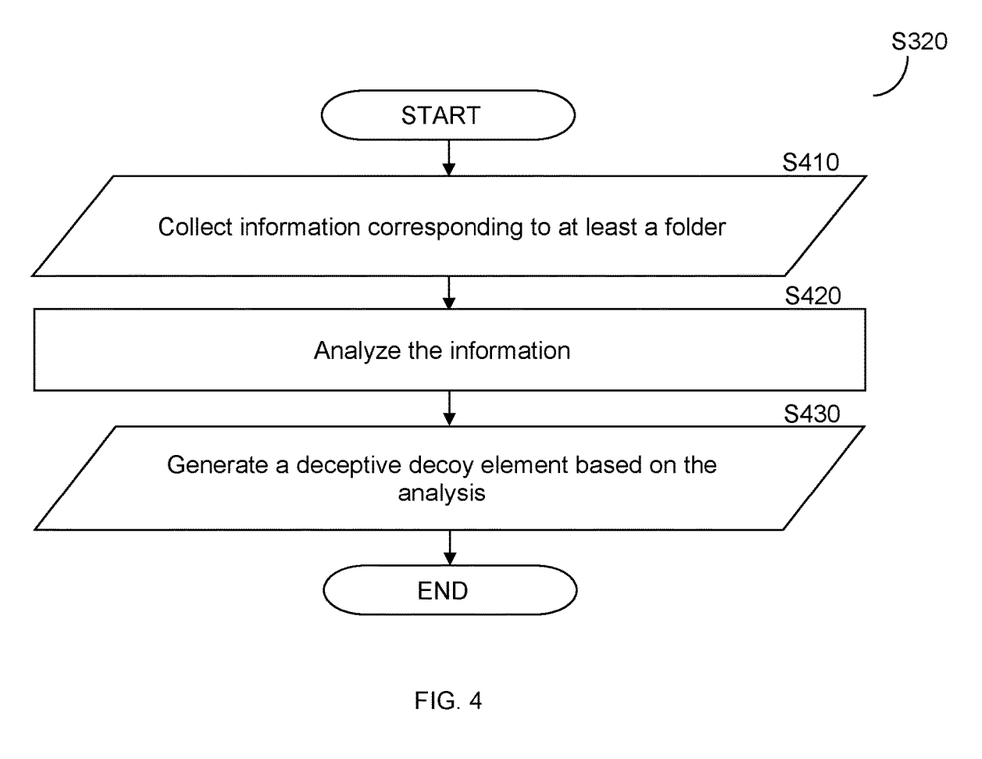
FIG. 4 is a flowchart illustrating a process for generating deceptive decoy elements according to an embodiment.

FIG. 4 is an example flowchart S320 illustrating a method for generating deceptive decoy elements according to an embodiment. In an embodiment, the method described herein below may be executed by the campaign manager (e.g., the campaign manager 130).

At S410, information related to a folder of the file system of the computerized environment (e.g., end-unit) is collected.

At S420, the collected information is analyzed. The analysis may include comparing each of the files stored in the folder to a plurality of other files stored in the folder for determining the average size of the files stored in the folder, the files' estimated creation time, and so on. The analysis may further include comparing the filenames to a plurality of keywords stored in an index for categorizing the folder. For example, a folder contains 90 files named "revenues 2017", "expenses", "dividends", and the like may be compared to a plurality of keywords stored in an index, wherein, based on the comparison to the index, the folder may be identified as a folder related to a finance department.

At S430, a deceptive decoy element is generated based on the analysis of the information. As noted above, the deceptive decoy element is generated such that it is designed to simulate a data element in the folder and, to this end, may have average, most often occurring, or otherwise typical properties among data elements in the folder.

Figure 5:
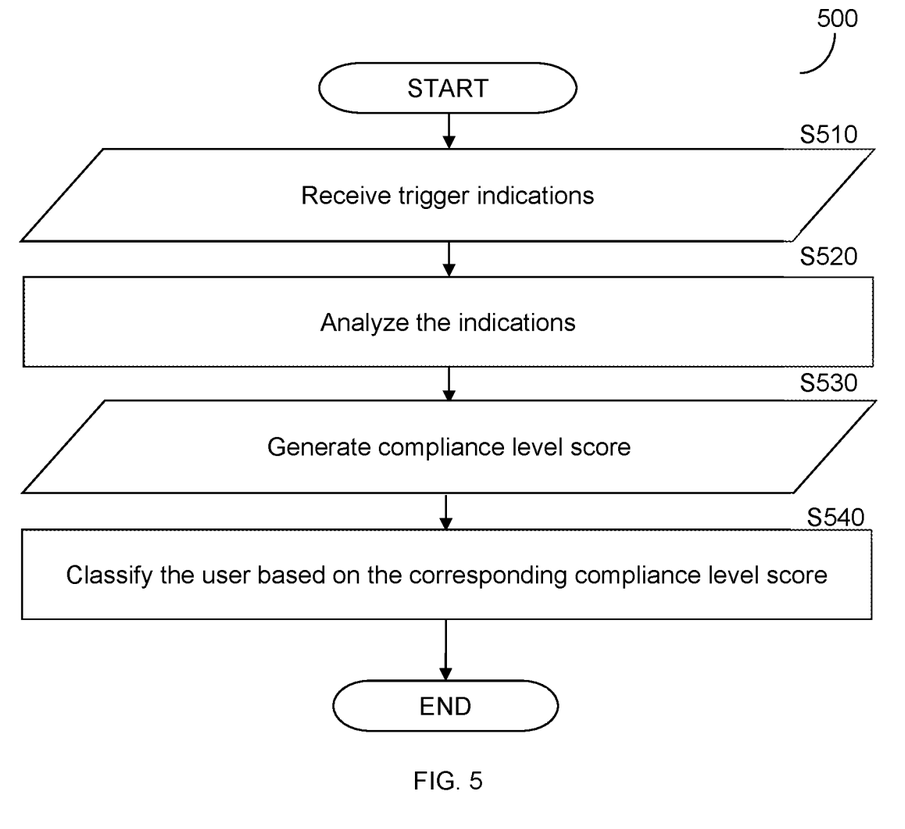
FIG. 5 is a flowchart illustrating a process for generating a compliance level score of a user and classifying the user based on the compliance level score according to an embodiment.

FIG. 5 is an example flowchart 500 illustrating a process for generating a compliance level score of a user and classifying the user based on the compliance level score according to an embodiment. In an embodiment, the method described herein below may be executed by a campaign manager (e.g., the campaign manager 130).

At S510, one or more indications of trigger events are received from at least one deceptive decoy element that is deployed in at least one folder to which the user has permission to access. As noted above, an indication may be received when, for example, the user opens a folder in which the deceptive decoy element is located, tries to open the deceptive decoy element, tries to save the deceptive decoy element, tries to send deceptive decoy element, a combination thereof, and the like.

As S520, the indications of trigger events are analyzed. The analysis may include applying a set of rules to the indications received from the deceptive decoy elements. As a non-limiting example, a rule may state that when a first indication indicated that a deceptive decoy element was opened only once by the user and after the user read the customized electronic message no security incidents were recorded for one month, the compliance level score may be "4" (which is relatively high score). As another non-limiting example, a rule may state that when an indication indicated that a deceptive decoy element was sent by the user to a different endpoint device the compliance level score may be "1" (which is the lowest score).

At S530, based on the analyzed indications, a compliance level score indicating the compliance level of the user with the cyber security policy is generated. The compliance level score may be, for example but not limited to, an integer having a value between "1" to "5", where "1" is the lowest score indicating that the user needs to improve the compliance level to the cyber security policy of the company, and "5" is the highest score indicating that the user fully understands and cooperates with the cyber security policy of the company.

At S540, the user is classified into a category of a plurality of categories based on the user's compliance level score. The classification may include several categories such as: category "A" that may include users that fully cooperate with the cyber security policy of the company and also report on suspicious files which they are not familiar with; category "B" may include users that fully cooperate with the cyber security policy of the company; category "C" may include users that are generally cooperating with the cyber security policy of the company but had some security incidents (e.g., opened one or more deceptive decoy elements).; category "D" may include users that had triggered a number of deceptive decoy elements that is above a predetermined threshold (e.g., more than 3 per week). The category ("c") may include users that had triggered a number of deceptive decoy elements that is below a predetermined threshold (below 3 per week). In an embodiment, the classification may be determined using a predefined set of rules.

It should be noted that the compliance level score may be generated and thereafter periodically updated with any new indications received from the deceptive decoy elements. Therefore, the classification of the user may be updated as well. It should also be noted that even when no new indications are received for a predetermined period, the user's compliance level score, as well as the user's classification, may be updated.

Figure 6:
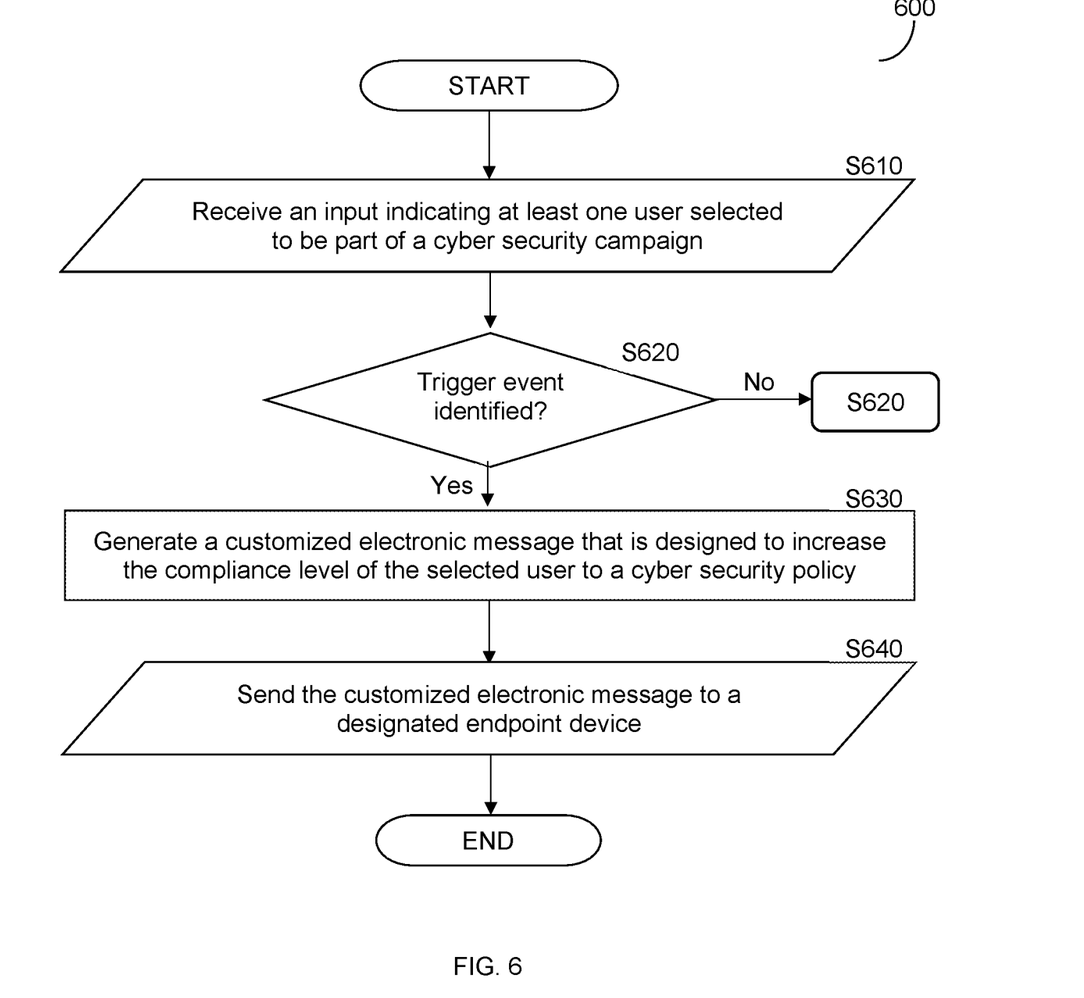
FIG. 6 is a flowchart illustrating a process for generating a customized electronic message designed to increase the compliance of users to a cyber security policy according to an embodiment.

FIG. 6 is an example flowchart 600 illustrating a method for generating a customized electronic message designed to increase the compliance of users to a cyber security policy according to an embodiment. In an embodiment, the method may be executed by a campaign manager (e.g., the campaign manager 130).

At S610, an input indicating a user that was selected to be part of a reactive cyber security awareness campaign is received. The user is associated with a first dataset. The first dataset may be indicative of at least one user permission for the user to access at least one folder of a plurality of folders that is stored in a computerized environment, such as, a file system of the company. In an embodiment, the first dataset includes, for example but not limited to, historical data of the user (e.g., historical record of security incidents), characteristics of the user (age, specific role, etc.), and so on.

At S620, it is checked whether one or more indications of trigger events have been received with respect to the folders to which the user has permission to access and if so, execution continues with S630; otherwise, execution continues with S620 where it is checked again whether a trigger event has been identified, for example, after a period of time has passed. In an embodiment, indications regarding trigger events may be received by monitoring a designated electronic report, a database, a log file, and so on, that is adapted to record events (i.e., activity) in the computerized environment. According to another embodiment, the indications may be received using an external application programming interface (API).

For example, a log file that tracks and records events (i.e., activity) in the computerized environment is monitored. The log file (e.g., access log file) is adapted to constantly record events that are related to folders to which the user has permission to access. A trigger event may occur when, for example, a file (e.g., a regular and real file) is opened, saved, copied, sent to a different endpoint device, a combination thereof, and so on.

As a non-limiting example, when the user saves a certain file that is stored in a folder to which the user has access, the event of opening the file is recorded in the log file. Thus, by monitoring the log file the event may be identified and also may be classified as a trigger event for generating a customized electronic message for the user, as further discussed herein below. Classification of events (normal and suspicious events) and trigger events may be achieved using a set of rules. A rule may indicate, for example, that when a file of a first folder is downloaded to an endpoint device, the event of downloading the file should be classified as a trigger event (e.g., for generating a customized electronic message that is designed to increase the compliance level of the user to a cyber security policy).

As another non-limiting example, an electronic notification is received indicating that a trigger event has been identified. The electronic notification may include data specifying the folder name, location, time at which the event occurred, and so on.

At S630, when a trigger event has been identified, at least one customized electronic message that is designed to increase the compliance level of the user to the cyber security policy of the company is generated. The customized electronic message may be generated based on the first dataset of the user. According to a further embodiment, the customized electronic message may be generated based on the set of properties of the folder that was handled by the user, as further described herein above with respect of FIG. 1.

At S640, the customized electronic message is sent to, for example, a designated endpoint device (e.g., the endpoint device 110) of the user, to designated server, to an endpoint device that is associated with the security manager of the company, and so on.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for deployment of deceptive decoy elements in a computerized environment to increase cyber security policy compliance, comprising:

deploying at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user;

generating a customized electronic message for the user when the indication of the trigger event is provided by one of the at least one deceptive decoy element, wherein the customized electronic message is generated based on the dataset associated with the user; and sending the customized electronic message for display on a user device of the user.

2. The method of claim 1, further comprising:
eliminating the at least one deceptive decoy element from the at least one folder after a predetermined period of time has passed since the at least one deceptive decoy element was deployed.

3. The method of claim 1, further comprising:
generating a compliance level score indicating a compliance level of the user to the cyber security policy based on the indication of the trigger event provided by one of the at least one deceptive decoy element.

4. The method of claim 3, further comprising:
monitoring each indication provided by the at least one deceptive decoy element; and
updating the compliance level score of the user based on the monitored indications.

5. The method of claim 1, further comprising:
generating an electronic recommendation to restrict a first user permission of the at least one user permission when an indication of a trigger event is not received during a predetermined period of time, wherein the first user permission is a permission to access a first folder of the at least one folder by the user.

6. The method of claim 1, further comprising:
analyzing properties of each of the plurality of folders to determine the sensitivity level of each folder.

7. The method of claim 6, further comprising:
updating the sensitivity level of at least a portion of the plurality of folders when it is determined that changes have occurred in the plurality of folders; and
adjusting the deployment of the at least one deceptive decoy element based on the updated sensitivity level of each folder of the plurality of folders.

8. The method of claim 1, wherein each deceptive decoy element is a data file simulating a data element in the computing environment, further comprising:
generating the at least one deceptive decoy element based on properties of the plurality of folders.

9. The method of claim 8, wherein the plurality of folders includes at least one type of data, wherein a first deceptive decoy element of the at least one deceptive decoy element excludes at least one predetermined type of data of the at least one type of data.

10. A non-transitory computer readable medium having stored thereon instructions for causing a processing circuitry to execute a process, the process comprising:
deploying at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user;

generating a customized electronic message for the user when the indication of the trigger event is provided by one of the at least one deceptive decoy element, wherein the customized electronic message is generated based on the dataset associated with the user; and sending the customized electronic message for display on a user device of the user.

11. A system for deployment of deceptive decoy elements in a computerized environment to increase cyber security policy compliance, comprising:

a processing circuitry; and a memory, the memory containing instructions that, when executed by the processing circuitry, configure the system to:

deploy at least one deceptive decoy element in at least one folder of a plurality of folders stored in a computerized environment, wherein a user is associated with a dataset indicating at least one user permission to access the at least one folder, each of the plurality of folders having a sensitivity level, wherein each deceptive decoy element is a data element deployed based on the sensitivity level of a respective folder of the plurality of folders in which the deceptive decoy element is deployed, wherein each deceptive decoy element is configured to provide an indication of a trigger event when triggered by the user;

generate a customized electronic message for the user when the indication of the trigger event is provided by one of the at least one deceptive decoy element, wherein the customized electronic message is generated based on the dataset associated with the user; and send the customized electronic message for display on a user device of the user.

12. The system of claim 11, wherein the system is further configured to:

eliminate the at least one deceptive decoy element from the at least one folder after a predetermined period of time has passed since the at least one deceptive decoy element was deployed.

13. The system of claim 11, wherein the system is further configured to:

generate a compliance level score indicating a compliance level of the user to the cyber security policy based on the indication of the trigger event provided by one of the at least one deceptive decoy element.

14. The system of claim 13, wherein the system is further configured to:

monitor each indication provided by the at least one deceptive decoy element; and update the compliance level score of the user based on the monitored indications.

15. The system of claim 11, wherein the system is further configured to:

generate an electronic recommendation to restrict a first user permission of the at least one user permission when an indication of a trigger event is not received during a predetermined period of time, wherein the first user permission is a permission to access a first folder of the at least one folder by the user.

16. The system of claim 11, wherein the system is further configured to:

analyze properties of each of the plurality of folders to determine the sensitivity level of each folder.

17. The system of claim 16, wherein the system is further configured to:

updating the sensitivity level of at least a portion of the plurality of folders when it is determined that changes have occurred in the plurality of folders; and adjust the deployment of the at least one deceptive decoy element based on the updated sensitivity level of each folder of the plurality of folders.

18. The system of claim 11, wherein each deceptive decoy element is a data file simulating a data element in the computing environment, wherein the system is further configured to:

generate the at least one deceptive decoy element based on properties of the plurality of folders.

19. The system of claim 18, wherein the plurality of folders includes at least one type of data, wherein a first deceptive decoy element of the at least one deceptive decoy element excludes at least one predetermined type of data of the at least one type of data.

* * * * *